Figure 4:
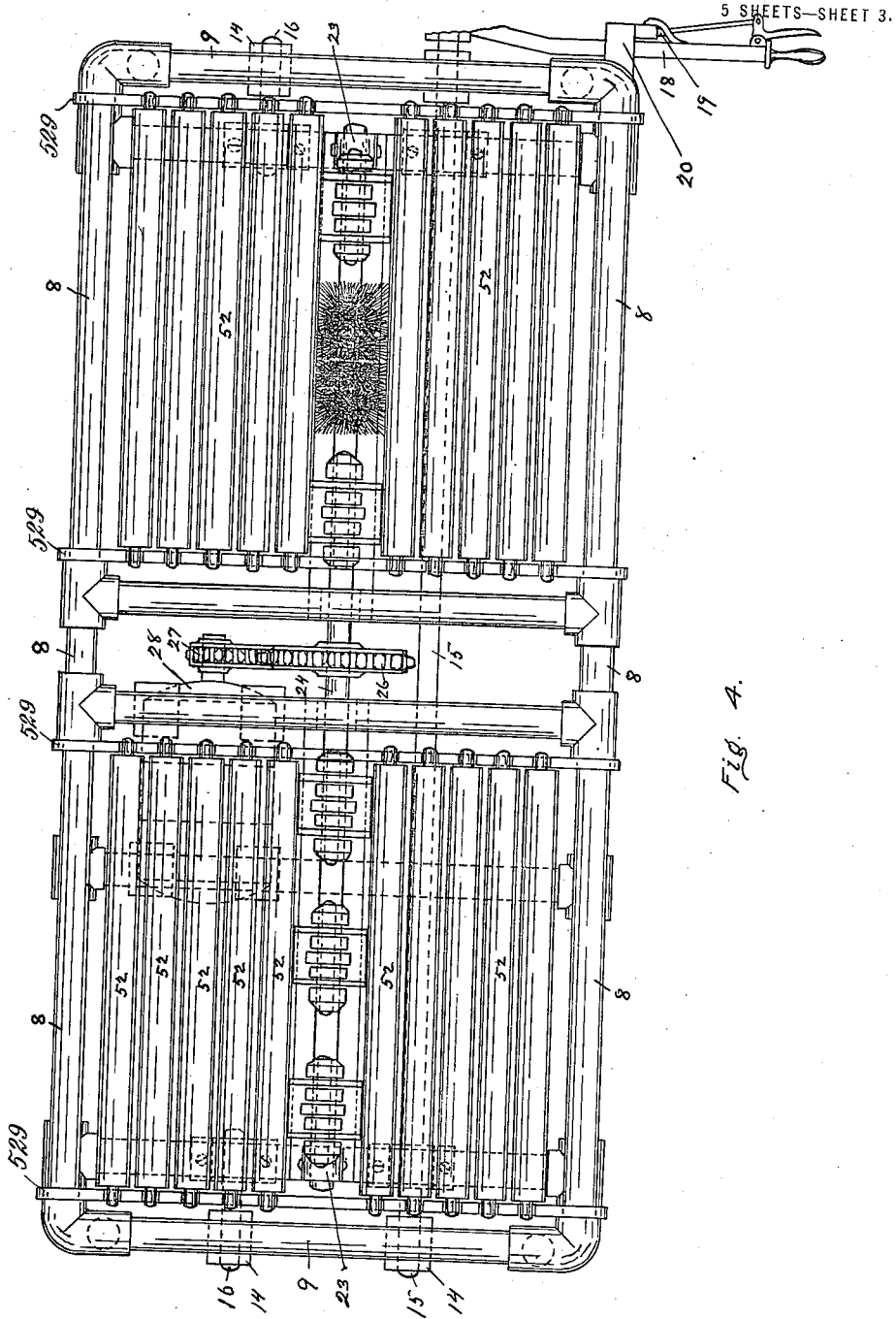

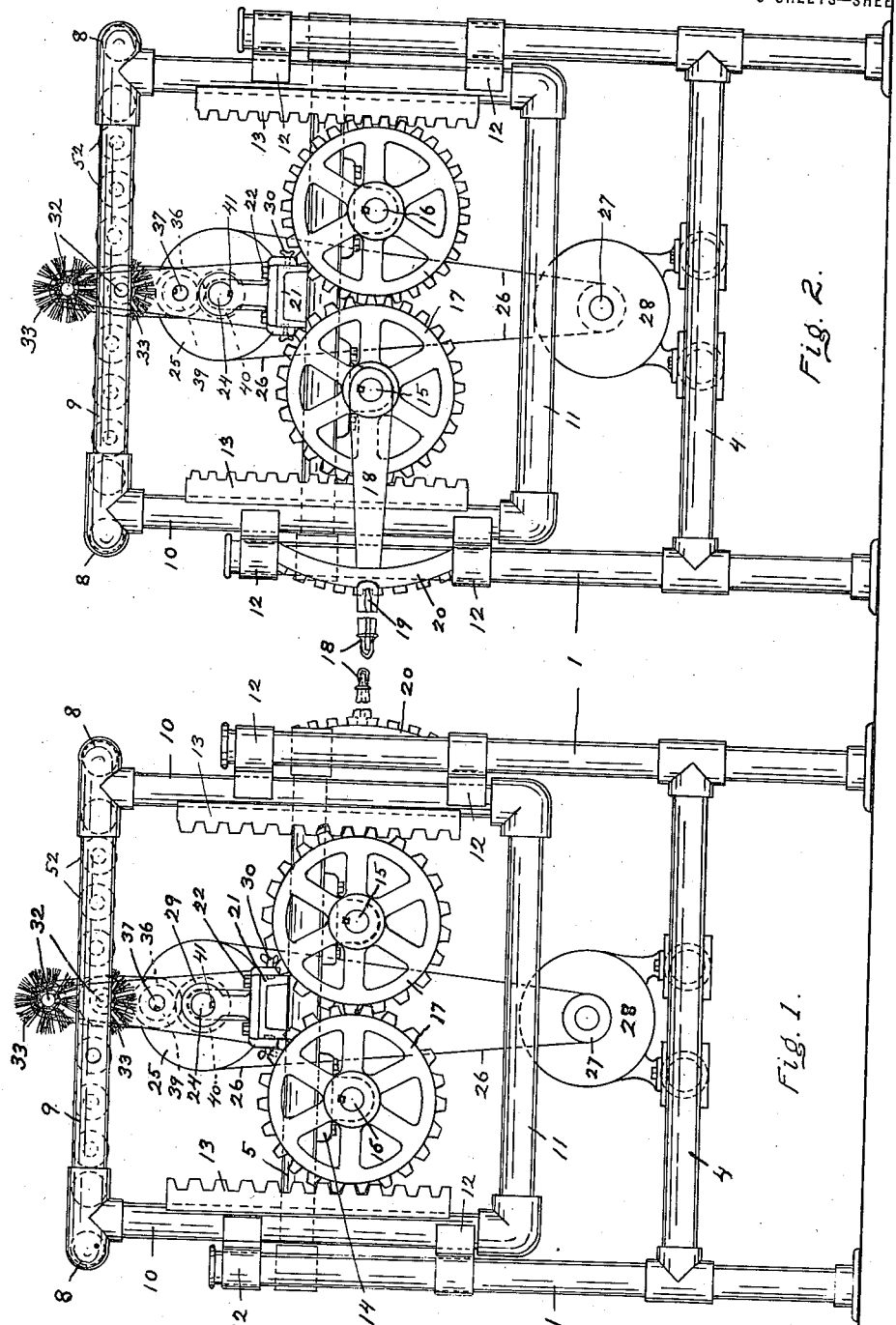

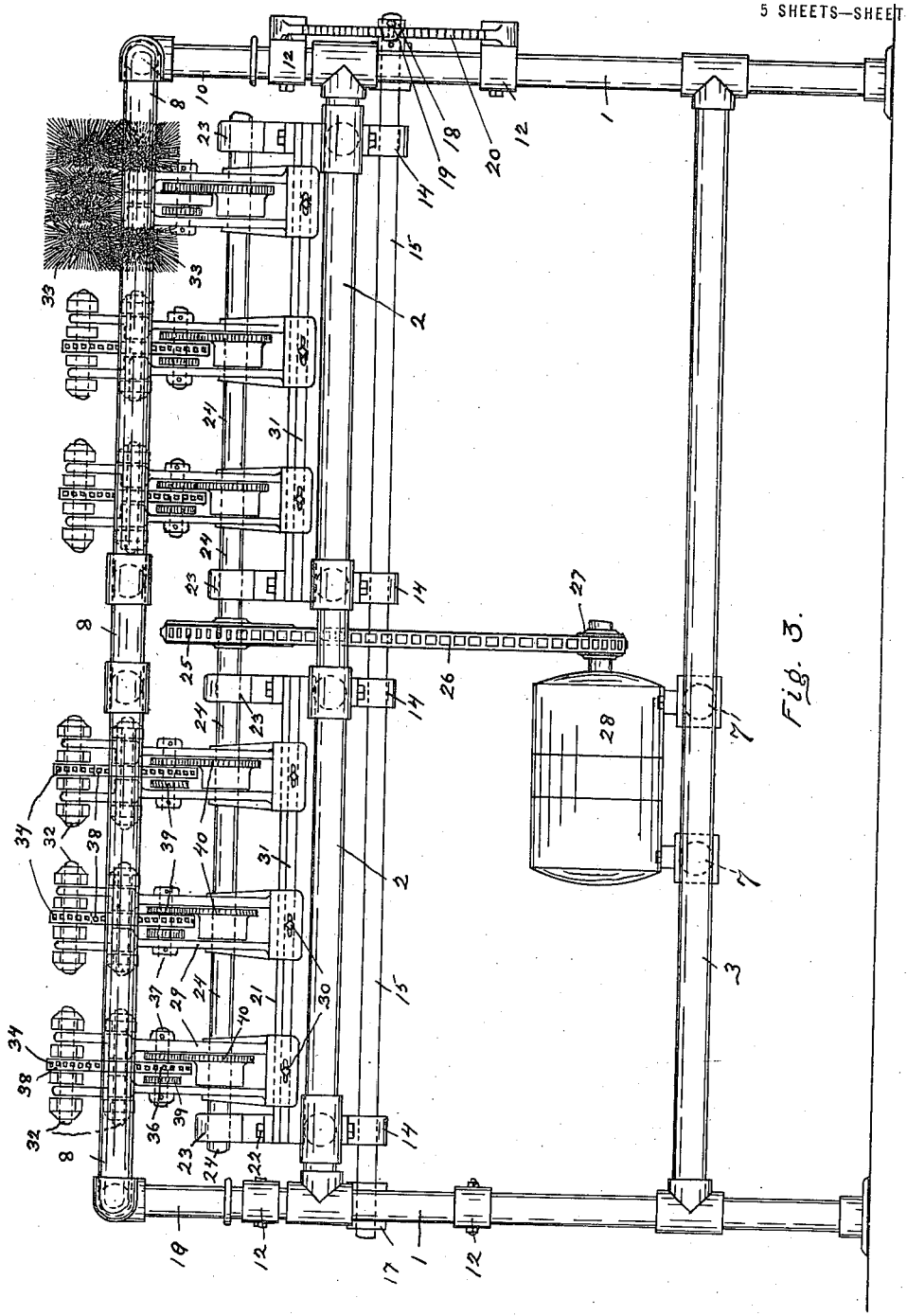

T. H. KELLER.
PAN CLEANING MACHINE.
APPLICATION FILED FEB. 20, 1915.

1,178,238.

Patented Apr. 4, 1916.
5 SHEETS—SHEET 3.

WITNESSES:

INVENTOR.
Thomas H. Keller.
BY
ATTORNEYS.

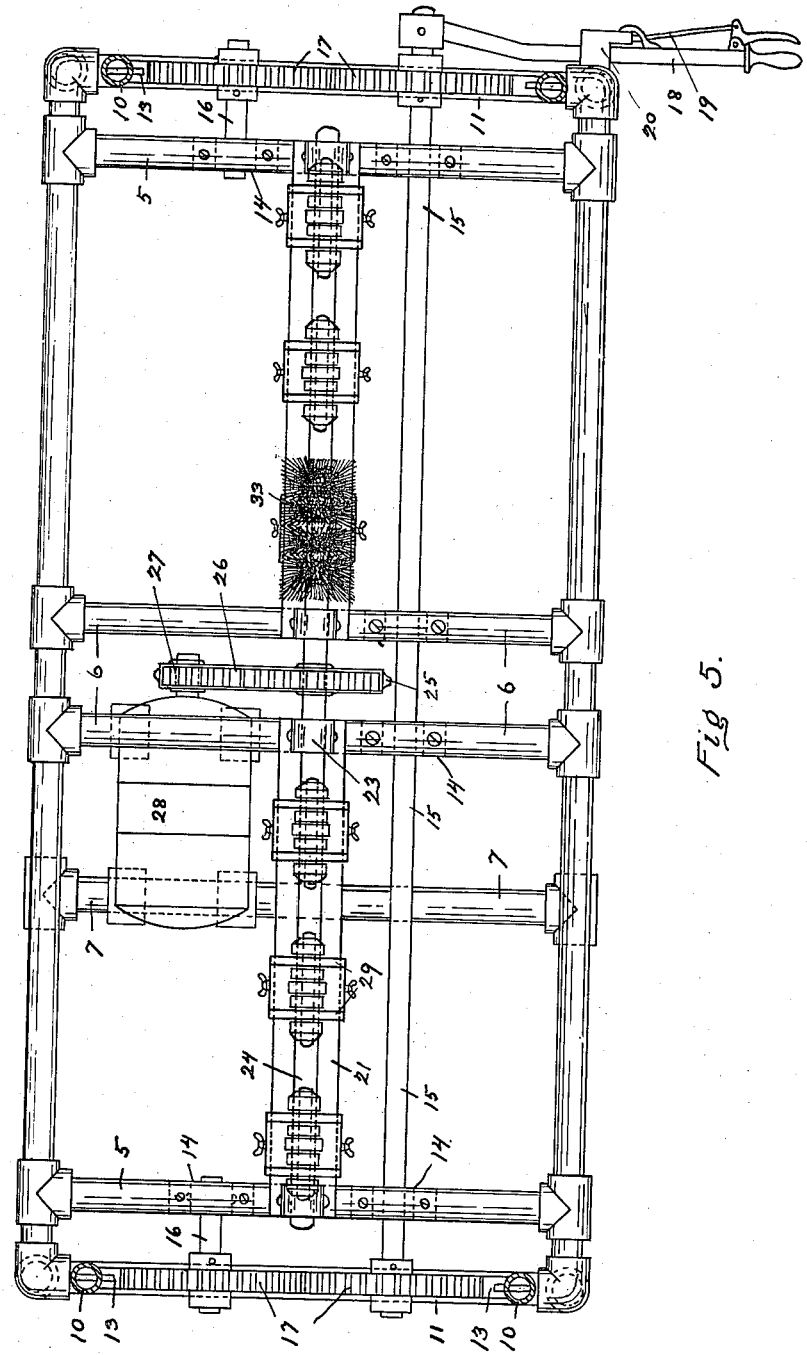

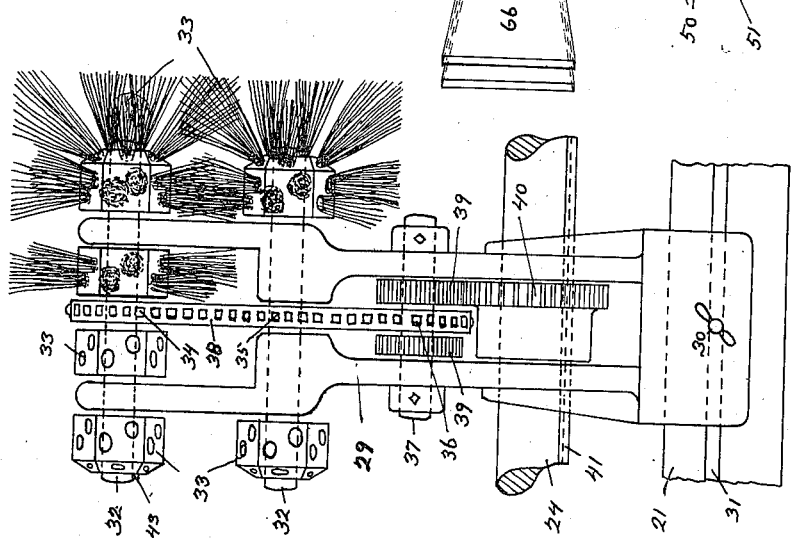

UNITED STATES PATENT OFFICE.

THOMAS H. KELLER, OF LANCASTER, PENNSYLVANIA, ASSIGNOR, BY DIRECT AND MESNE ASSIGNMENTS, TO EDWIN C. FEIGENSPAN, OF NEWARK, NEW JERSEY.

PAN-CLEANING MACHINE.

1,178,238.

Specification of Letters Patent.

Patented Apr. 4, 1916.

Application filed February 20, 1915. Serial No. 9,604.

*To all whom it may concern:*

Be it known that I, THOMAS H. KELLER, a citizen of the United States, residing at Lancaster, in the county of Lancaster and State of Pennsylvania, have invented certain new and useful Improvements in Pan-Cleaning Machines, of which the following is a specification, reference being had therein to the accompanying drawing.

My invention relates to a machine for cleaning and greasing pans such as are used by bakers for baking bread. The machine is intended for removing the crust and burnt particles which adhere to the pans, and to scour and grease them preparatory to further baking operations.

The object of my invention is to provide a machine comprising a brush and an adjustable table or support surrounding the said brush, upon which the pan may be supported in an inverted position over the brush, so that the brush while the pan is supported may be brought into engagement with the inner surfaces of the pan, and so that the pan may be moved while held upon the support in an inverted position to bring all parts of its inner surfaces in contact with the brush.

A further object of my invention is to so combine the brush and the support for the pan that they may be adjustable relatively to each other to cause the brush to project varying distances beyond the pan supporting surface of the support to adapt the machine for operation upon pans of varying depth.

A further object of my invention is to provide for a plurality of brush supports adapted to be adjusted with relation to each other for operation upon pans varying in size; and a further object is to provide for the ready removal of the brushes and their supports for cleaning and sterilizing the same, and also to adapt the brushes to be readily replaced when worn out.

With these and other objects in view, my invention consists in the pan cleaning machine, and in the devices and combinations of devices which will be hereinafter described and claimed.

My invention is illustrated in the accompanying drawings, in which—

Figure 1 shows the machine in end elevation looking at the left-hand end of the machine; Fig. 2 is an elevation of the opposite end of the machine; Fig. 3 is a front elevation of the machine showing a plurality of brush supports with one equipped with brushes; Fig. 4 is a top plan view of the machine also showing a plurality of brush supports with one support equipped with brushes; Fig. 5 is a horizontal sectional view taken on a line cutting the table support immediately below the table, but showing the support for the brush standards, and said standards and said parts in top plan view; Fig. 6 is an enlarged side elevation of one of the brush standards and its brush; Fig. 7 is a front elevation of one of the brush standards, and showing a plurality of complete brushes mounted therein, and also showing the brush hubs; Fig. 8 is a side elevation of one of the brush hubs; Fig. 9 is an end elevation of one of the brush hubs; Fig. 10 is a detail of construction of a swab to be used in lieu of the brushes; Fig. 11 is an end elevation of a hub of the swab with the swab members illustrated in broken views; Fig. 12 is a side elevation of a detail of an automatically shifting clutch, whereby the rotary movement of the brushes or swabs will be automatically reversed.

Similar reference characters will be employed throughout the specification and drawings to designate corresponding parts.

Referring to the drawings, I have here shown my frame and table as being constructed of tubing as being clean, strong and sanitary, but it is understood that any other suitable material may be used if it is desirable to do so.

The frame comprises the four corner posts or legs 1, which are joined together by the side bars 2, and which are also secured by the lower braces 3 and 4, while the side bars 2 are joined together near their ends by the end bars 5. The side bars 2 are also secured together near the center thereof by two cross braces 6, which are spaced apart for the purpose of allowing the driving mechanism to come between, and the lower braces 3 are also joined together by cross rods 7, near the center thereof, and which are intended to support a motor for operating the machine.

The adjustable table comprises a rectangular frame composed of the sides 8 and ends 9, to which are secured the depending legs 10 which are joined together at their lower ends by the bar 11.

The depending legs 10 of the table are placed outside of the end bars 5 and between, parallel and adjacent to the frame posts 1, and are held in place by suitable guides 12, which embrace them and which are secured to the frame posts 1, and in this manner the table is held in place, and guided in its upward and downward movement.

For raising and lowering the table, I have here shown a simple combination of parts comprising a vertical rack 13, secured to each of the table legs 10, and each end pair parallel to and facing each other; while to each of the end bars 5 and cross braces 6 of the frame, is secured a pair of bearings 14, within one set of which is rotatably mounted a shaft 15; while in the other set are secured stud shafts 16.

On the ends of these shafts 15 and 16 are secured the spur gears 17, each pair of which are in mesh with each other and with the adjacent racks 13; while to one end of the shaft 16, is secured a hand lever 18 for rotating said shaft 15 and gears 17 for raising and lowering the racks 13, and so the table; while for locking the table at any required height, the hand lever 18 is provided with a latch 19 engaging a segment 20 secured to one leg of the frame.

Upon the upper sides of the end bars 5 and cross braces 6, are secured the longitudinal alined and inverted channel irons 21 (which act as supports and guides for the brush standards), by the bolts 22, which also serve to hold thereon the bearings 23 for the main drive shaft 24 which extends the entire length of the machine. Near the center of said drive shaft 24, and between the cross braces 6, is secured thereon a sprocket wheel 25, which is intended to be rotated by a chain 26 from a sprocket 27 placed on the motor 28.

On the channel irons 21 are mounted in a detachable, reversible and longitudinally adjustable manner the brush standards 29, which comprise two upwardly extending sides integral at their lower ends with a base which embraces the channel irons 21, and which is detachably secured thereto by the set screws 30, which are threaded through the sides of said base and engage a groove 31 formed in the side of the channel irons 21. The standard is provided in its sides and near the base thereof with a slotted bearing or opening for the shaft 24, and extending through the base, allowing the standard to be lifted off of said drive shaft 24. In the sides of said standard near the upper end are rotatably mounted two parallel horizontal brush shafts 32, one above the other, and on which are mounted the brushes 33; said shafts 32 are rotated by the sprockets 34 and 35 secured thereon, and a sprocket 36 secured on a shaft 37 placed in said standard below the brush shafts 32; all of said sprockets 34, 35 and 36 being connected by a chain 38, while the sprocket 36 is driven by either one of a pair of spur gears 39, which is secured on the same shaft 37 and which is driven by a spur gear 40, which is placed on the main drive shaft 24, and which remains on said shaft when the standard carrying the sprocket chain and gear 39 is removed. By the use of two gears 39, the standard may be reversed on the channel.

To allow the gear 40 to slide upon the drive shaft 24, when the standards are adjusted to accommodate pans of different sizes, the shaft 24 is provided with a key or feather 41, and the gear 40, with a keyway.

For removing the brushes from the standards for the purpose of renewal, the brush shafts 32 are each provided with a keyway 42 and the sprockets 34 and 35, and brush hubs 53, with keys 43, and in this manner the shafts may be removed from the standards to release the brushes; the outside brushes being held upon the ends of the shafts in a normally locked position by a suitable catch or pin. I have also provided a novel form of brush and swab hub, whereby the bristles or swab material may be removed; and this comprises a brush hub 33, made of several parts 44, 45 and 46, which are provided with openings 47 to receive the bristles, and which when the bristles are secured by wire or cement, may be secured together by a rivet or other means. Or the hubs 49 may be formed with grooves 50 to hold the swab material 66, which is secured therein by clamps and pins 51.

In operating the machine, the table is raised to the required height to accommodate the depth of pan to be cleaned which is placed in an inverted position over one or more brush standards with the edges of the pan resting upon the rollers 52, supported in parallel relation to each other in cross bars 529, which form the table top; and by a reciprocating movement imparted to the pan by the operator every corner and inner surface of the pan is reached by the brushes on account of their shape, as will be seen by the drawings.

In Fig. 12, I have shown a combined reducing, driving and reversing mechanism whereby the speed of the brushes is reduced and at predetermined intervals the direction of rotation of the brushes is changed in an automatic manner, or may be changed by hand at the will of the operator. This device comprises a frame 67 which is secured to the frame of the machine near the center thereof, and adjacent to the motor. In this frame is mounted a vertical shaft 68, having secured on its lower end a worm gear 54, which is driven by a worm 55 on the motor shaft. On the upper end of said shaft 68 is mounted a bevel gear 56 which meshes with two bevel gears 57 which are loosely mounted on the main drive shaft 24. These two bevel gears 57 are provided with clutch members 58 to engage with a sliding clutch 59, which is mounted between them on the drive shaft 24 in a sliding manner but prevented from rotation on said shaft by the spline and feather 41. This clutch is brought in engagement with the two bevel gears 57, one at a time to rotate the main shaft 24, first in one direction and then in the other direction by the action of a yoke 60, running in a groove in said clutch 59, and provided with an arm 61 pivoted to the frame 67 and extending downward and provided with a roller 62 on its lower end, which runs in a cam-race 63 formed on one side of a worm wheel 64 mounted in said frame 67, and driven by a worm 65 secured upon the vertical shaft 68 and depending upon the ratio of the gearing, the reversing mechanism can be made to shift the clutch once every few minutes and hold the same in engagement with first one and then the other of the bevel gears 57 for a few minutes. If it is desired to operate the reversing mechanism by hand, the worm wheel 64 and worm 65 may be dispensed with and the lever 61 operated by hand.

Having thus described my invention, what I claim as new and desire to secure by Letters Patent, is:

1. In a pan cleaning machine, a brush, and a table or support, the brush projecting above the upper surface of the table or support to engage the inner surfaces of a pan held in an inverted position on said support, said table or support being of such area as to permit a relative lateral movement of the pan and brush.

2. In a pan cleaning machine, a brush, a table or support, the brush projecting above the upper surface of the table or support to engage the inner surfaces of a pan held in an inverted position on said support, and means for relatively adjusting the brush and the table or support to vary the height of the brush above the table or support, said table or support being of such area as to permit a relative lateral movement of the pan and brush.

3. In a pan cleaning machine, a brush and a support for said brush, a table or support provided with an opening through which the brush and its support projects, and means for raising and lowering the table or support to vary the height of the brush above the table or support, said table or support being of such area as to permit a relative lateral movement of the pan and brush.

4. In a pan cleaning machine, a vertically adjustable table having an opening, a brush support passing through said opening and having a brush at its upper end, and means for operating said brush, said table or support being of such area as to permit a relative lateral movement of the pan and brush.

5. In a pan cleaning machine, a vertically adjustable table having an opening therein, a plurality of brush supports passing through said opening and carrying brushes at their upper ends, and means for adjusting said brush supports and brushes toward and from each other.

6. In a pan cleaning machine, a vertically adjustable table having an opening therein, a brush supporting standard passing through said opening, a rotary brush carried by said standard, and means for rotating said brush, said table or support being of such area as to permit a relative lateral movement of the pan and brush.

7. In a pan cleaning machine, a table having an opening therein, a brush support passing through said opening carrying a brush at its upper end, means for operating said brush, and means permitting a disconnection of the operating means and a removal of the brush support and brush for cleansing, said table or support being of such area as to permit a relative lateral movement of the pan and brush.

8. In a pan cleaning machine, a vertically movable table provided with an opening, a brush support having a brush at its upper end passing through said opening, suitable gearing for raising and lowering the table, and means for locking the table in its adjusted position, said table or support being of such area as to permit a relative lateral movement of the pan and brush.

9. In a pan cleaning machine, a brush supporting standard, a rotary brush mounted therein, a driving shaft and connected mechanism for operating said rotary brush, and means for disconnecting the brush operating means from the driving shaft to permit the brush supporting standard and its brush to be removed for cleaning, and a table for supporting the pan, said table being of such area as to permit a relative lateral movement of the pan and brush.

10. In a pan cleaning machine, a pan supporting table having an opening therein, a brush support passing through said opening, a plurality of rotary shafts carried by said support and projecting above the upper surface of the table, and brushes mounted on said shafts, said table or support being of such area as to permit a relative lateral movement of the pan and brush.

11. In a pan cleaning machine, a pan supporting table having an opening therein, a plurality of rollers arranged in parallel relation to each other and forming the brush supporting surface of said table, a brush support passing through said opening, and a brush mounted on said support above said rollers.

In testimony whereof I affix my signature in presence of two witnesses.

THOMAS H. KELLER.

Witnesses:
A. F. SHENCK,
JOHN J. THOMPSON.